US006143398A

United States Patent [19]

Tsou et al.

[11] Patent Number: 6,143,398
[45] Date of Patent: Nov. 7, 2000

[54] THERMAL TRANSFER COLOR-VARIABLE RIBBONS FOR PERIPHERAL PRINTERS

[75] Inventors: Yi-Jen Tsou, Taipei; Fang-Chuan Ho; Han-Chung Wang, both of Hsinchu; Tomy Cheng, Makung, all of Taiwan

[73] Assignee: Industrial Technology Research Institute, Hsinchu, Taiwan

[21] Appl. No.: 09/116,021

[22] Filed: Jul. 15, 1998

[30] Foreign Application Priority Data

Nov. 5, 1997 [TW] Taiwan ................................ 86116504

[51] Int. Cl.[7] ..................................................... B32B 15/00

[52] U.S. Cl. .......................... 428/209; 428/195; 428/469; 428/472; 428/913; 428/914

[58] Field of Search .................................... 428/195, 209, 428/913, 914, 469, 472

[56] References Cited

U.S. PATENT DOCUMENTS 5,248,652 9/1993 Talvalkar ................................ 503/201

*Primary Examiner*—Bruce H. Hess
*Assistant Examiner*—Michael Grendzynski
*Attorney, Agent, or Firm*—Harness, Dickey & Pierce, P.L.C.

[57] ABSTRACT

A thermal transfer color-variable ribbon is disclosed, the color appearance of which depends on the variation of viewing angle, which includes a substrate, a releasing agent formed on the substrate, a functional coating, which can be a multilayer thin-film stack of reflection mode or transmission mode, formed on the releasing agent, and an adhering layer formed on the functional coating. The functional coating is designed based on the general theory that describes the thin-film interference phenomena. The functional coating can be formed by alternately stacking dielectrics having high and low refractive indices or dielectric and metal layers. The construction parameters of the all-dielectric stack and the metal/dielectric stack can be chosen in similar way to how parameters are chosen when manufacturing selective band-pass filters, which are designed based on the thin-film interference theory. The color appearance of the printed document, either in reflection mode or in transmission mode, can be selected and optimized as for the filter design. The effect of varying incident angle on color appearance of the functional coating in either mode can also be optimized during the design. Furthermore, the functional coating can be a inhomogeneous thin-film. The refractive index of the inhomogeneous thin film is varied along the growth direction.

9 Claims, 9 Drawing Sheets

THERMAL TRANSFER COLOR-VARIABLE RIBBONS FOR PERIPHERAL PRINTERS

BACKGROUND OF THE INVENTION

1. Field of the Invention

The present invention relates to thermal transfer ribbons for peripheral printers and more particularly to thermal transfer color-variable ribbons for peripheral printers.

2. Description of Prior Art

Conventional color ribbons used in thermal transfer printing processes are shown in FIG. 1. Ribbon prepared by this method usually contains only a single layer of a thin film material which produces a selected color independent of viewing angle. The conventional ribbon often contains a sensible dye, or pigment material in a binding material, e.g., thermoplastic resin. The "ink" is transferred to the receiving medium through dye diffusion into the receiving medium or solid wax binding to the surface of the receiving medium.

Conventional ribbons have the following disadvantages. First, film stress, which exists in the single layer of thin film material, contributes to the fragility of the transferred film during the process and on the printed documents as well. Second, colored documents prepared in accordance with this technique may be duplicated with advanced image simulating processes and therefore are susceptible to high-tech counterfeiting.

SUMMARY OF THE INVENTION

Accordingly, the present invention provides thermal transfer color-variable ribbons for peripheral printers.

This invention replaces the single thermal wax-transferred layer with a multilayer stack whose individual layer thickness and layer refractive indices are carefully selected according to a sophisticated designing procedure. The resulting ribbon produces variable colors depending on viewing angle.

To overcome the existing disadvantages, ribbons of this invention have the following features: First, the materials of the multilayer stack are selected to compensate the thin-film stress effect. Second, the multilayer stack has a dielectric top layer for scratch and smear resistance. Third, the use of sophisticated techniques in the design and preparation of the multilayer ribbon increase the value of the product. Fourth, the spectral shift of a multilayer coating corresponding to the incident angle of the radiation makes the transferred ribbon vary its color with change of viewing angle. This allows the color displayed to be more entertaining and amusing. Fifth, the above characteristics can be applied as an effective defense to counterfeiting methods for valued documents.

BRIEF DESCRIPTION OF THE DRAWINGS

The following detailed description, given byway of example and not intended to limit the invention solely to the embodiments described herein, will best be understood in conjunction with the accompanying drawings in which:

In FIGS. 3–9, G represents green, YHG represents yellowish green, Y represents yellow, OY represents orange yellow, O represents orange, YHP represents yellowish pink, RHO represents reddish orange, PI represents pink, PHR represents purplish red, RHP represents reddish purple, P represents purple, PHP represents purplish pink, PHB represents purplish blue, B represents blue, GHB represents greenish blue, BHG represents bluish green, and W represents white.

DETAILED DESCRIPTION OF THE PREFERRED EMBODIMENTS

The basic structure of a thermal transfer color-variable ribbon of this invention includes a substrate such as PET or mylar, an undercoating, an overcoating, and a functional coating. The functional coating, which is sandwiched in between the undercoating and the overcoating, is of either an odd number of dielectric layers formed by alternating two materials with high and low refractive indices, or an even number of metal/dielectric layers which include a dielectric protective layer, at least one pair of thin-films formed by a thin semi-transparent conducting layer, and a dielectric spacer layer, and an opaque metallic reflecting layer. The undercoating contains heat-sensitive material which serves as a releasing agent. The overcoating contains a wax emulsion mixture which melts upon heating and adheres to the receiving medium, such as paper, plastics and the like.

During printing, the overcoating side of the ribbon is brought into contact with the surface of the receiving medium and the print head comes into contact with the substrate side of the ribbon to apply force and heat, whereby the releasing agent releases the functional coating, and the mixture of wax emulsion in the overcoating is melted to adhere the released functional coating on the receiving medium. The amount of heat for optimal transfer can be adjusted by the compositions of overcoating and undercoating.

Figure 1:
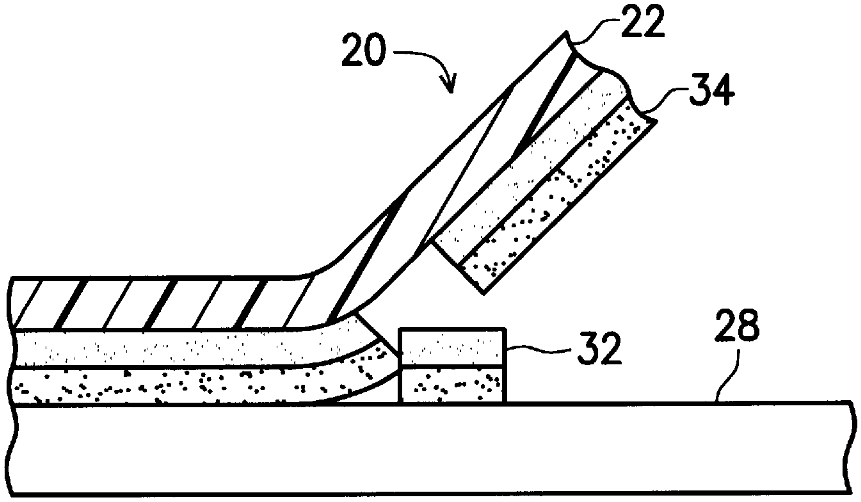
FIG. 1 (PRIOR ART)
FIG. 1 is a diagram illustrating a prior-art thermal transfer ribbon that is printed on a medium.
Figure 2:
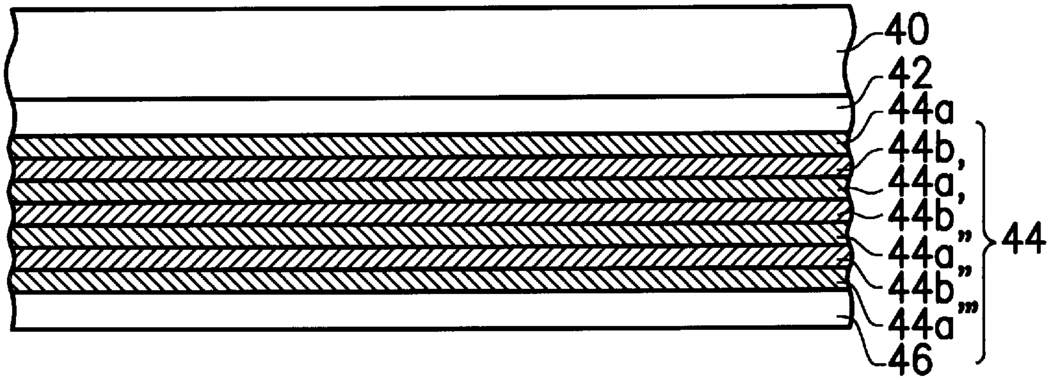
FIG. 2 is a diagram illustrating the structure of a thermal transfer color-variable ribbon according to one embodiment of this invention.

Referring to FIG. 2, the first embodiment of the thermal transfer color-variable ribbon of this invention has a structure of all-dielectric multilayer stack, which includes a thin substrate 40, a releasing agent 42 formed on the thin substrate 40, a functional coating 44, which can be a multilayer thin-film stack of reflection mode or transmission mode, formed on the releasing agent 42, an adhering layer 46 formed on the functional coating 44. The functional coating is designed based on the general theory that describes the thin-film interference phenomena. The functional coating 44 can be formed by alternately stacking dielectrics having high refractive index 44*a*, 44*a*', 44*a*", 44*a*'" and dielectrics having low refractive index 44*b*, 44*b*', 44*b*". The construction parameters of the all-dielectric stack can be chosen in similar way to the parameters chosen for selective band-pass filters, which are designed based on the thin-film interference theory. The color appearance of the printed document, either in reflection mode or transmission mode, can be selected and optimized as the filter design. The effect of varying incident angle on color appearance of the functional coating in either mode can also be optimized during the design.

According to the first embodiment of this invention, the parameters of each dielectric layer in a red thermal-transfer color-variable ribbon are listed in the following Table 1.

TABLE 1

| Layer No. Substrate (Receiving medium) | Material Glass/plastic | Physical Thickness (nm) | Refractive index (550 nm) 1.52 |
|---|---|---|---|
| 1 | $ZrO_2$ | 40.38 | 2.019 |
| 2 | $SiO_2$ | 169.39 | 1.455 |
| 3 | $ZrO_2$ | 67.14 | 2.019 |
| 4 | $SiO_2$ | 128.56 | 1.455 |
| 5 | $ZrO_2$ | 82.66 | 2.019 |
| 6 | $SiO_2$ | 101.75 | 1.455 |
| 7 | $ZrO_2$ | 109.61 | 2.019 |
| Exit medium | Air | | |

Figure 3:
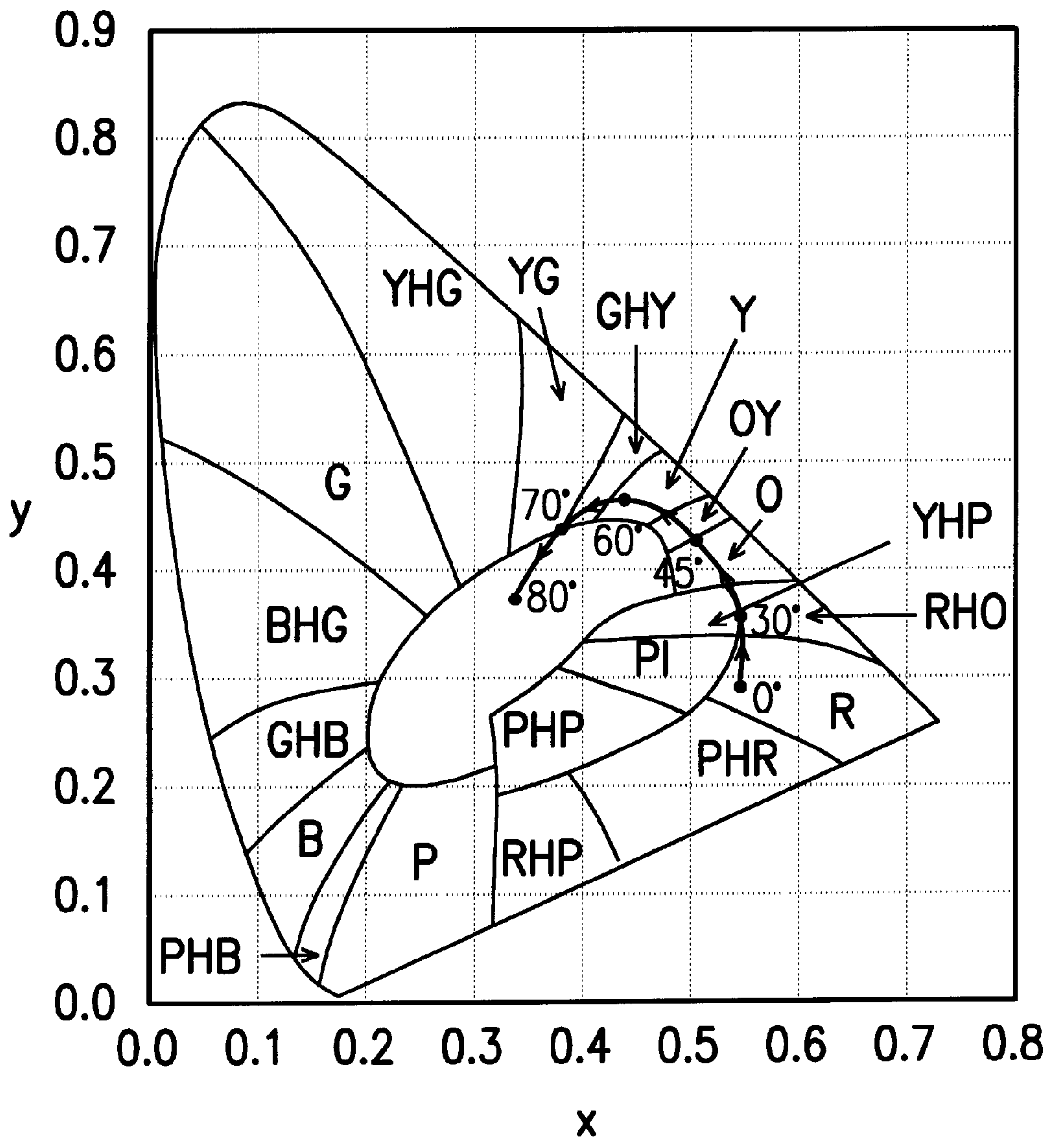
FIG. 3 is the chromaticity diagram for illustrating the color of a red ribbon, which has a structure as shown in FIG. 2, at various viewing angles.

Table 2 shows the relationship between the incident angle and the trichromatic coefficients upon reflection for the thermal transfer color-variable ribbon, which is manufactured according to the parameters listed in Table 1. More detailed data are provided in FIG. 3.

TABLE 2

| Incident angle(°) | x- axis | y- axis | Luminosity(%) | Color |
|---|---|---|---|---|
| 0 | 0.545 | 0.295 | 17.42 | Red |
| 30 | 0.541 | 0.361 | 30.54 | Reddish Orange |
| 45 | 0.505 | 0.433 | 46.13 | Orange |
| 60 | 0.440 | 0.472 | 55.54 | Yellow |
| 70 | 0.386 | 0.447 | 54.77 | White |
| 80 | 0.339 | 0.381 | 56.38 | White |

According to the first embodiment of this invention, the parameters of each dielectric layer in a blue thermal-transfer color-variable ribbon are listed in the following Table 3.

TABLE 3

| Layer No. Substrate (Receiving medium) | Material Glass/plastic | Physical Thickness (nm) | Refractive index (550 nm) 1.52 |
|---|---|---|---|
| 1 | $ZrO_2$ | 160.42 | 2.019 |
| 2 | $SiO_2$ | 221.50 | 1.455 |
| 3 | $ZrO_2$ | 150.87 | 2.019 |
| 4 | $SiO_2$ | 73.33 | 1.455 |
| 5 | $ZrO_2$ | 174.43 | 2.019 |
| 6 | $SiO_2$ | 87.63 | 1.455 |
| 7 | $ZrO_2$ | 169.75 | 2.019 |
| Exit medium | Air | | |

Figure 4:
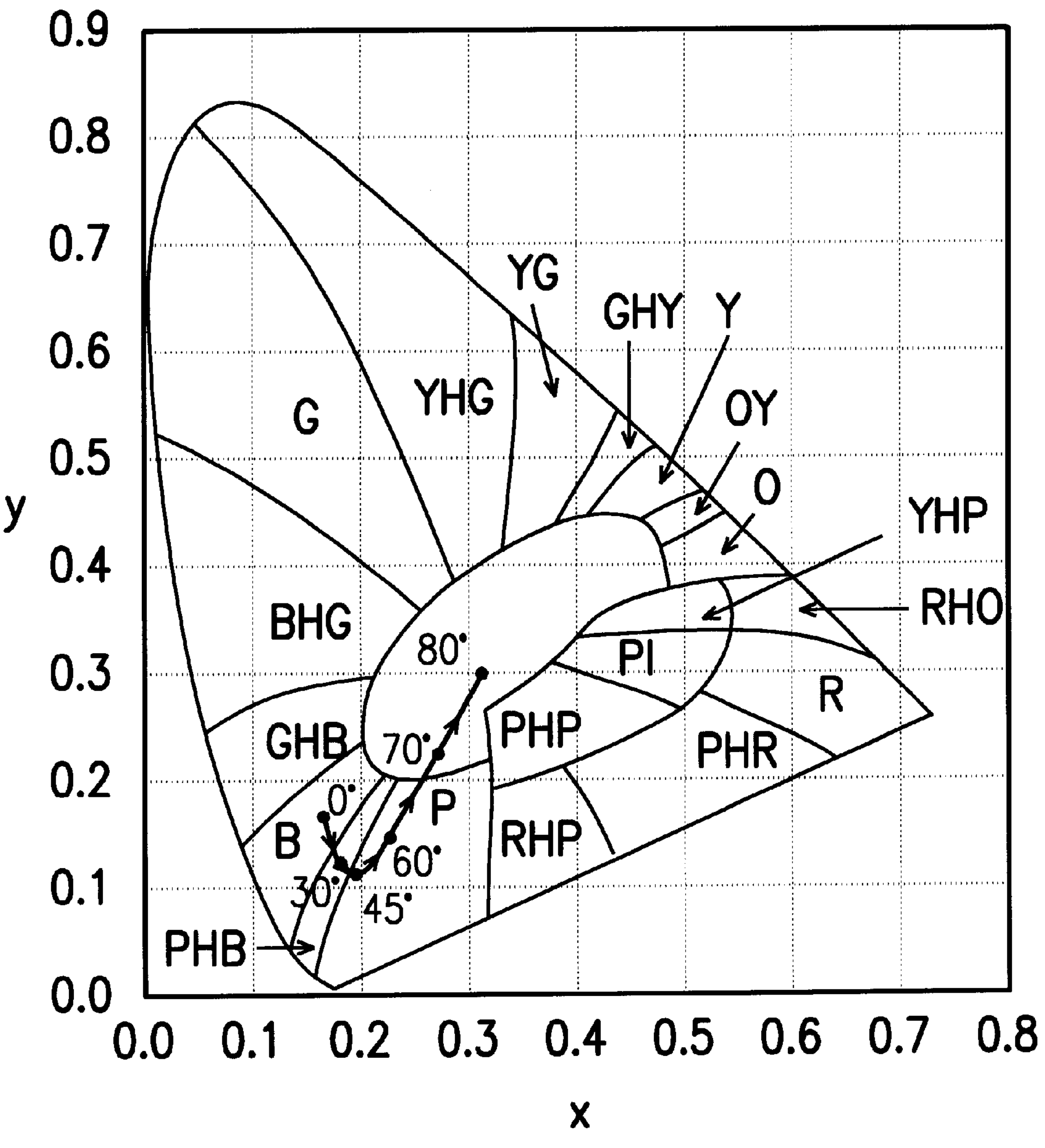
FIG. 4 is the chromaticity diagram illustrating the color of a blue ribbon, which has a structure as shown in FIG. 2, at various viewing angles.

Table 4 shows the relationship between the incident angle and the trichromatic coefficients upon reflection for the thermal transfer color-variable ribbon, which is manufactured according to the parameters listed in Table 3. More detailed data are provided in FIG. 4.

TABLE 4

| Incident angle(°) | x- axis | y- axis | Luminosity(%) | Color |
|---|---|---|---|---|
| 0 | 0.163 | 0.170 | 15.17 | Blue |
| 30 | 0.174 | 0.126 | 10.68 | Purplish Blue |
| 45 | 0.192 | 0.113 | 8.51 | Purple |
| 60 | 0.222 | 0.154 | 10.89 | Purple |
| 70 | 0.261 | 0.222 | 18.25 | White |
| 80 | 0.309 | 0.299 | 39.09 | White |

According to the first embodiment of this invention, the parameters of each dielectric layer in a green thermal transfer color-variable ribbon are listed in the following Table 5.

TABLE 5

| Layer No. Substrate (Receiving medium) | Material Glass/plastic | Physical thickness (nm) | Refractive index (550 nm) 1.52 |
|---|---|---|---|
| 1 | $TiO_2$ | 171.61 | 2.189 |
| 2 | $SiO_2$ | 83.70 | 1.455 |
| 3 | $TiO_2$ | 177.39 | 2.189 |
| 4 | $SiO_2$ | 92.06 | 1.455 |
| 5 | $TiO_2$ | 177.40 | 2.189 |
| 6 | $SiO_2$ | 96.84 | 1.455 |
| 7 | $TiO_2$ | 165.13 | 2.189 |
| Exit medium | Air | | |

Figure 5:
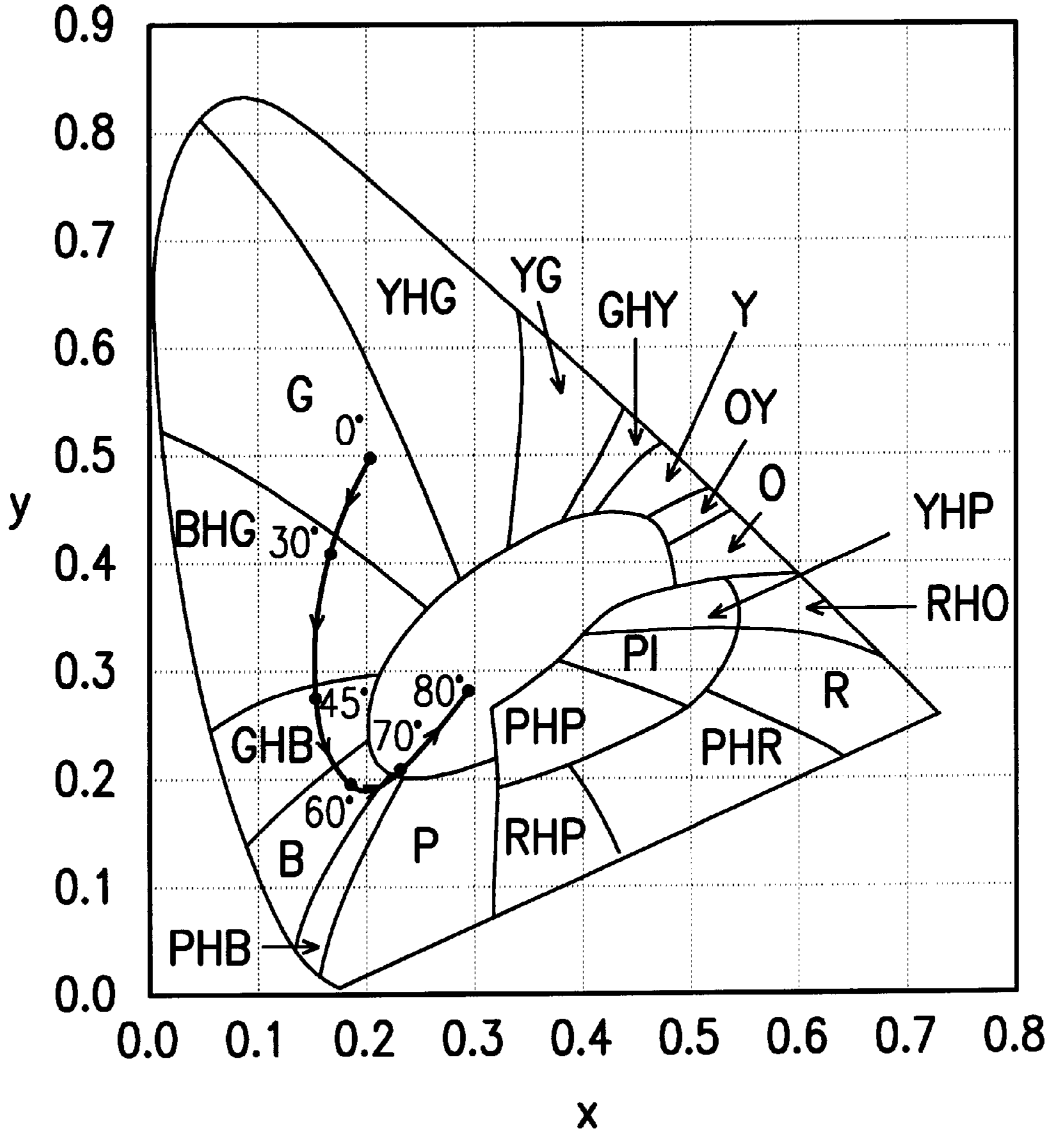
FIG. 5 is the chromaticity diagram illustrating the color of a green ribbon, which has a structure as shown in FIG. 2, at various viewing angles.

Table 6 shows the relationship between the incident angle and the trichromatic coefficients upon reflection for the thermal transfer color-variable ribbon, which is manufactured according to the parameters listed in Table 5. More detailed data are provided in FIG. 5.

TABLE 6

| Incident angle(°) | x- axis | y- axis | Luminosity(%) | Color |
|---|---|---|---|---|
| 0 | 0.204 | 0.505 | 46.52 | Green |
| 30 | 0.157 | 0.413 | 34.67 | Bluish green |
| 45 | 0.147 | 0.278 | 23.89 | Greenish blue |
| 60 | 0.178 | 0.193 | 18.45 | Blue |
| 70 | 0.224 | 0.209 | 22.66 | White |
| 80 | 0.290 | 0.283 | 41.35 | White |

Figure 6:
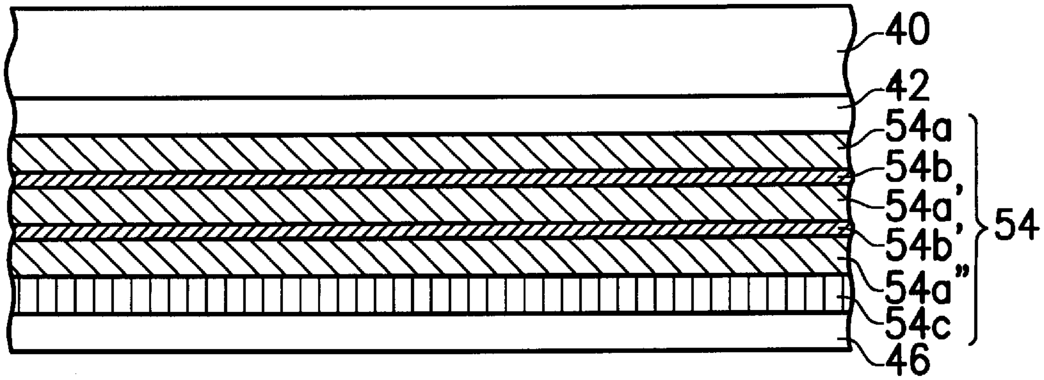
FIG. 6 is a diagram illustrating the structure of a thermal transfer color-variable ribbon according to another embodiment of this invention.

Referring to FIG. 6, the second embodiment of the thermal transfer color-variable ribbon of this invention includes a thin substrate 40, a releasing agent 42 formed on the thin substrate 40, a functional coating 54 formed on the releasing agent 42, an adhering layer 46 formed on the functional coating 54. The functional coating is designed based on the general theory that describes the thin-film interference phenomena.

The functional coating 54 is formed by alternately stacking dielectrics 54*a*, 54*a*', 54*a*" and metal layers 54*b*, 54*b*', 54*c*. The construction parameters of the metal/dielectric stack can be determined based on the thin-film interference theory. The color appearance of the printed document, either in reflection mode or transmission mode, can be selected and optimized as the filter design. The effect of varying incident angle on color appearance of the functional coating in either mode can also be optimized during the design.

According to the second embodiment of this invention, the parameters of each metal layer and each dielectric layer in a red thermal transfer color-variable ribbon are listed in the following Table 7.

TABLE 7

| Layer No. Substrate | Material Al | Physical Thickness(nm) |
|---|---|---|
| 1 | $SiO_2$ | 204.80 |
| 2 | Cr | 3.74 |
| 3 | $SiO_2$ | 227.04 |
| 4 | Cr | 3.75 |
| 5 | $SiO_2$ | 54.31 |
| Exit medium | Air | |

Figure 7:
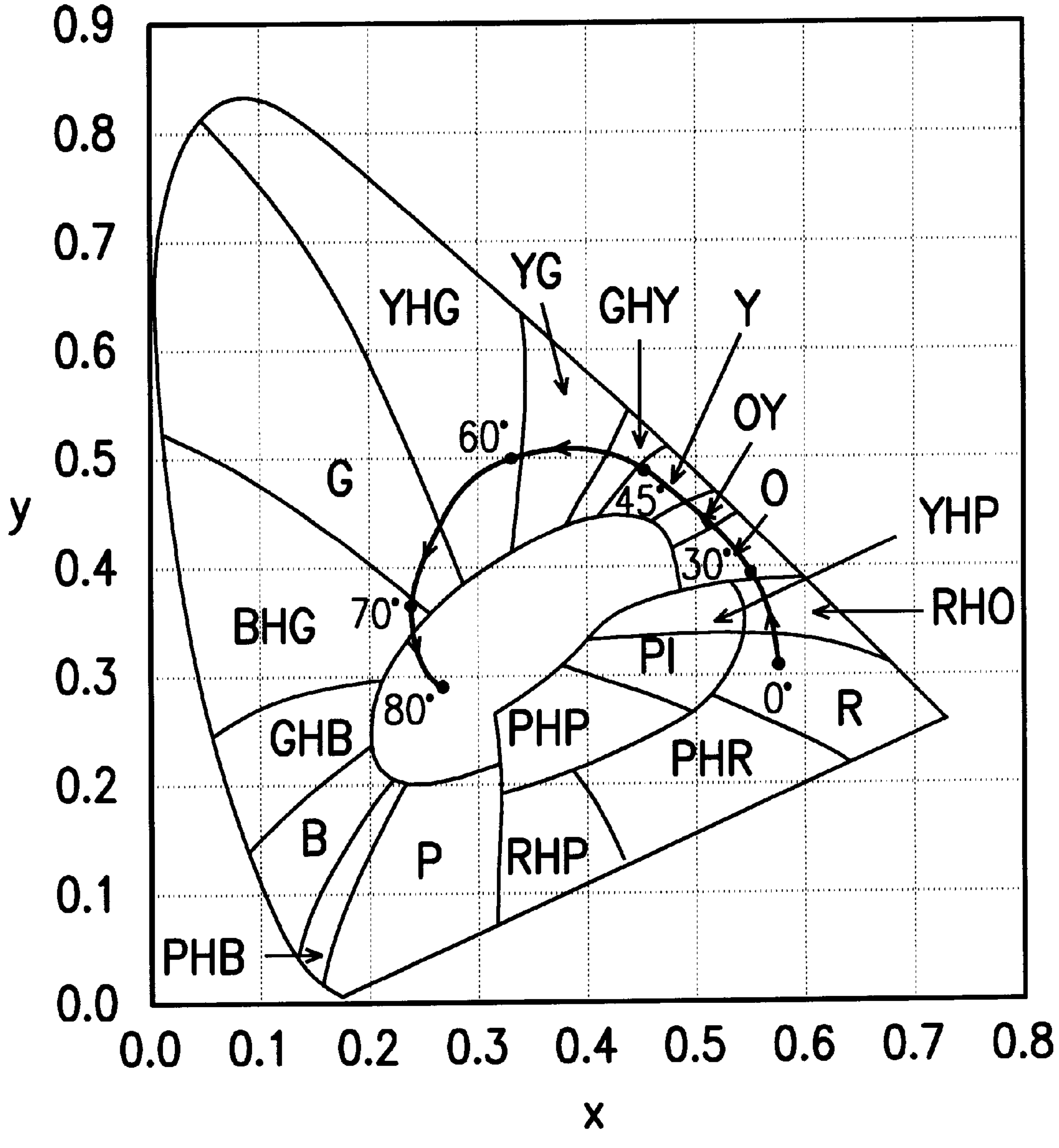
FIG. 7 is the chromaticity diagram illustrating the color of a red ribbon, which has a structure as shown in FIG. 6, at various viewing angles.

Table 8 shows the relationship between the incident angle and the trichromatic coefficients upon reflection for the thermal transfer color-variable ribbon, which is manufactured according to the parameters listed in Table 7. More detailed data are provided in FIG. 7.

TABLE 8

| Incident angle(°) | x– axis | y– axis | Luminosity(%) | Color |
|---|---|---|---|---|
| 0 | 0.581 | 0.316 | 17.44 | Red |
| 30 | 0.556 | 0.401 | 37.80 | Orange |
| 45 | 0.452 | 0.485 | 57.91 | Yellow |
| 60 | 0.298 | 0.484 | 56.49 | Yellowish green |
| 70 | 0.243 | 0.375 | 46.50 | Bluish green |
| 80 | 0.267 | 0.296 | 48.47 | White |

According to the second embodiment of this invention, the parameters of each metal layer and each dielectric layer in a blue thermal-transfer color-variable ribbon are listed in the following Table 9.

TABLE 9

| Layer No. Substrate | Material Al | Physical Thickness(nm) |
|---|---|---|
| 1 | $SiO_2$ | 146.11 |
| 2 | Cr | 7.29 |
| 3 | $SiO_2$ | 154.17 |
| 4 | Cr | 3.17 |
| 5 | $SiO_2$ | 124.59 |
| Exit medium | Air | |

Figure 8:
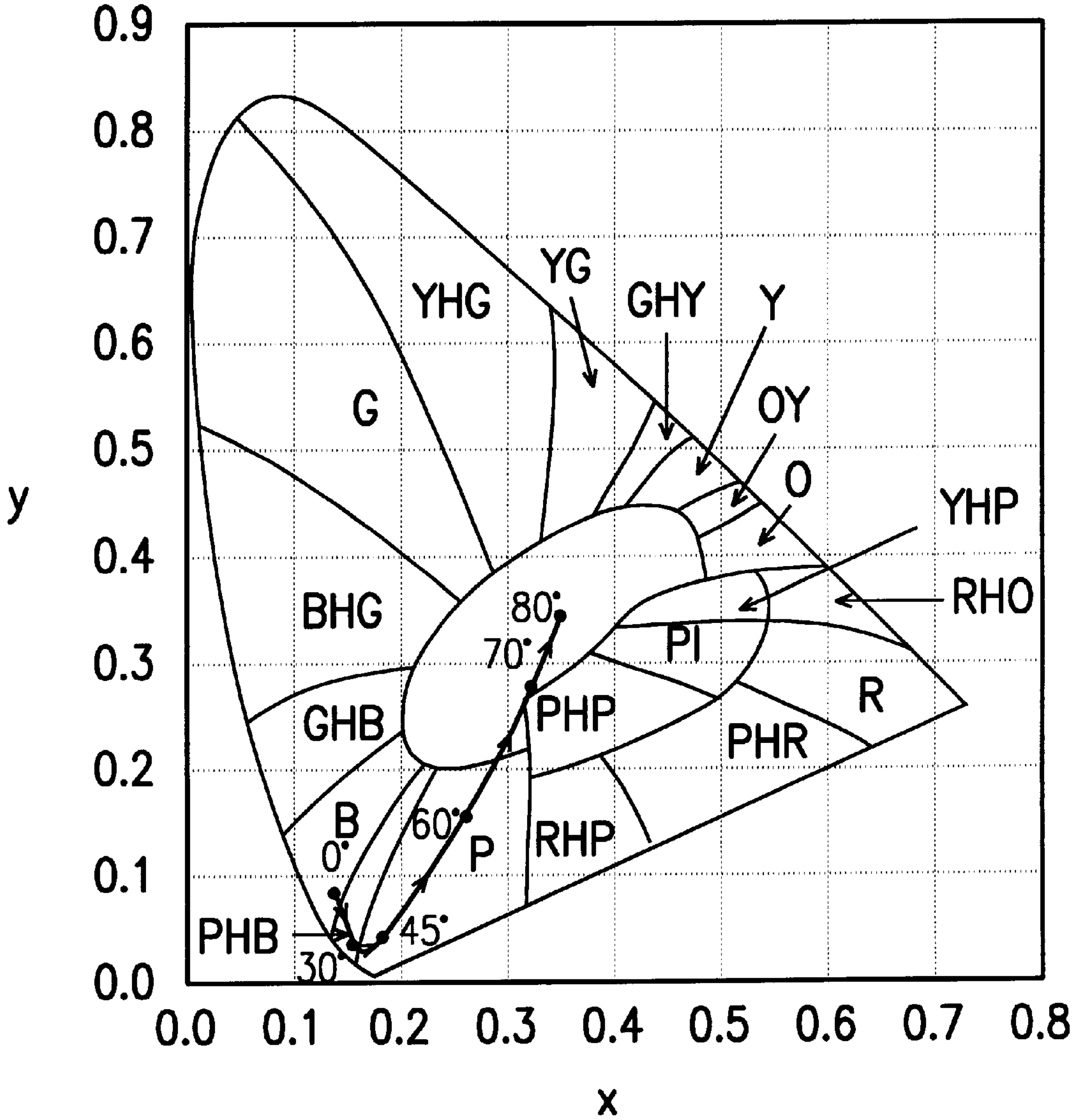
FIG. 8 is the chromaticity diagram illustrating the color of a blue ribbon, which has a structure as shown in FIG. 6, at various viewing angles.

Table 10 shows the relationship between the incident angle and the trichromatic coefficients upon reflection for the thermal transfer color-variable ribbon, which is manufactured according to the parameters listed in Table 9. More detailed data are provided in FIG. 8.

TABLE 10

| Incident angle(°) | x– axis | y– axis | Luminosity(%) | Color |
|---|---|---|---|---|
| 0 | 0.138 | 0.078 | 7.73 | blue |
| 30 | 0.156 | 0.029 | 2.37 | Purplish blue |
| 45 | 0.173 | 0.032 | 1.37 | purple |
| 60 | 0.258 | 0.161 | 4.14 | purple |
| 70 | 0.324 | 0.279 | 12.52 | Purplish red |
| 80 | 0.344 | 0.336 | 36.09 | white |

According to the second embodiment of this invention, the parameters of each metal layer and each dielectric layer in a green thermal transfer color-variable ribbon are listed in the following Table 11.

TABLE 11

| Layer No. Substrate | Material Al | Physical Thickness(nm) |
|---|---|---|
| 1 | $SiO_2$ | 164.25 |
| 2 | Cr | 1.21 |
| 3 | $SiO_2$ | 175.89 |
| 4 | Cr | 3.92 |
| 5 | $SiO_2$ | 26.80 |
| Exit medium | Air | |

Figure 9:
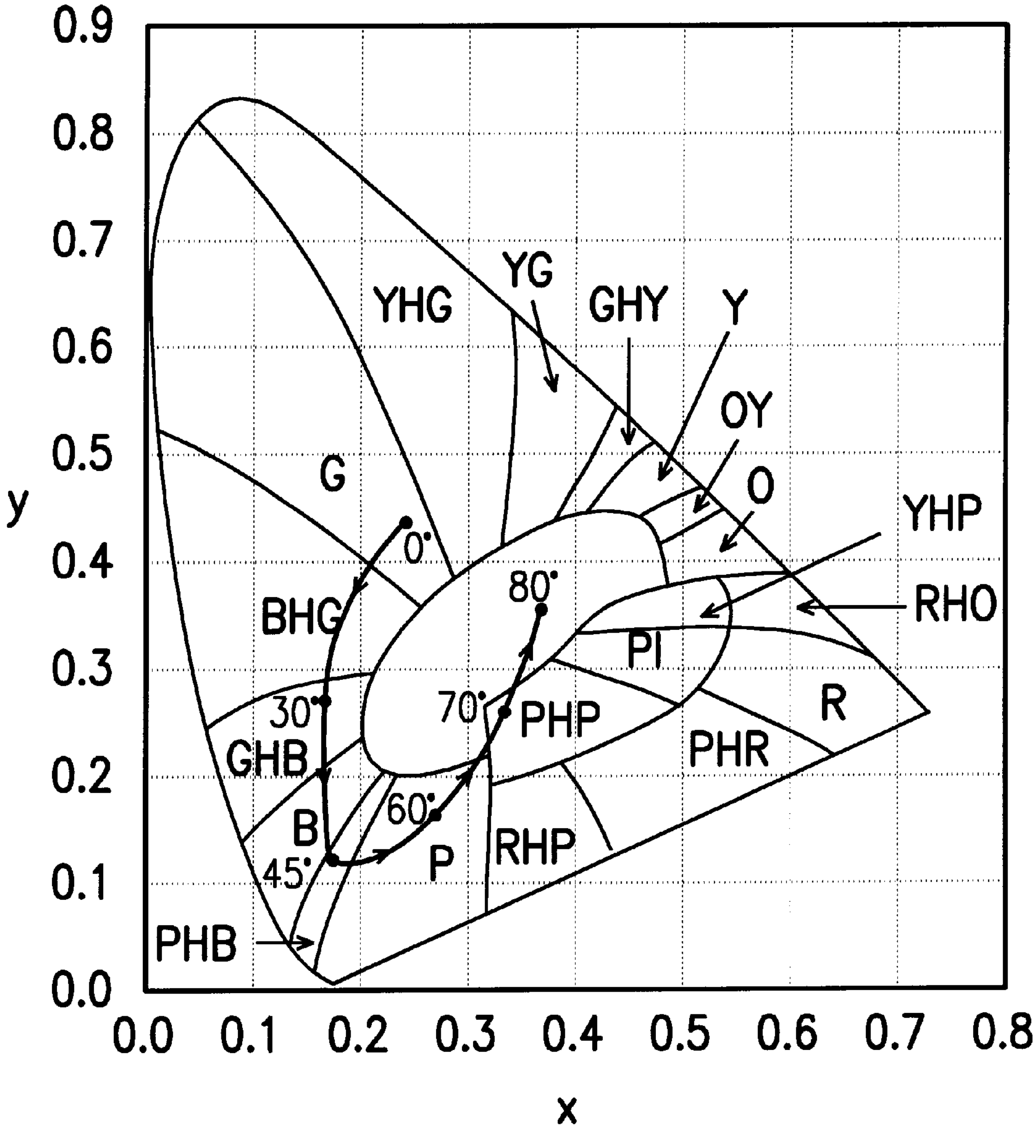
FIG. 9 is the chromaticity diagram illustrating the color of a green ribbon, which has a structure as shown in FIG. 6, at various viewing angles.

Table 12 shows the relationship between the incident angle and the trichromatic coefficients upon reflection for the thermal transfer color-variable ribbon, which is manufactured according to the parameters listed in Table 11. More detailed data are provided in FIG. 9.

TABLE 12

| Incident angle(°) | x– axis | y– axis | Luminosity(%) | Color |
|---|---|---|---|---|
| 0 | 0.245 | 0.449 | 51.49 | Green |
| 30 | 0.169 | 0.278 | 30.39 | Greenish blue |
| 45 | 0.171 | 0.127 | 13.92 | Purplish blue |
| 60 | 0.261 | 0.153 | 15.21 | Purple |
| 70 | 0.344 | 0.280 | 29.32 | Purplish pink |
| 80 | 0.367 | 0.361 | 54.71 | White |

In the above Tables 1 to 12, examples of red, green and blue ribbons designed in reflection mode at normal incidence, together with their CIE coordinates, loci in the chromaticity diagram as a function of incident angle, and corresponding color appearance in reflection mode, are presented. When preparing the ribbon, the release agent is first applied onto the PET web, and then the functional coating is coated in reverse order compared with that on the document to be printed. Finally, the overcoating, which can be, for example, a mixture of 43% ethyl acetate, 38% methanol and 19% isopropyl alcohol, is coated on the top surface of the functional coating.

In this invention, when the functional coating is formed only by dielectric materials, the number of layers constituting the functional coating is odd. However, when the functional coating is formed by metal and dielectric materials, the number of layers constituting the functional coating is even.

The functional coating can also be a single layer of inhomogeneous thin-film, the refractive index of which is varied along the growth direction.

Variation of the refractive index with the film thickness of the inhomogeneous thin-film can be designed based on the Fourier transform method of thin-film interference coating technology. The color appearance of the printed document can be selected and optimized as for the filter design. The effect of varying incident angle on color appearance of the functional coating can also be optimized during the design. Such an inhomogeneous thin-film can be fabricated by the conventional process of co-evaporation or co-sputtering.

Figure 10:
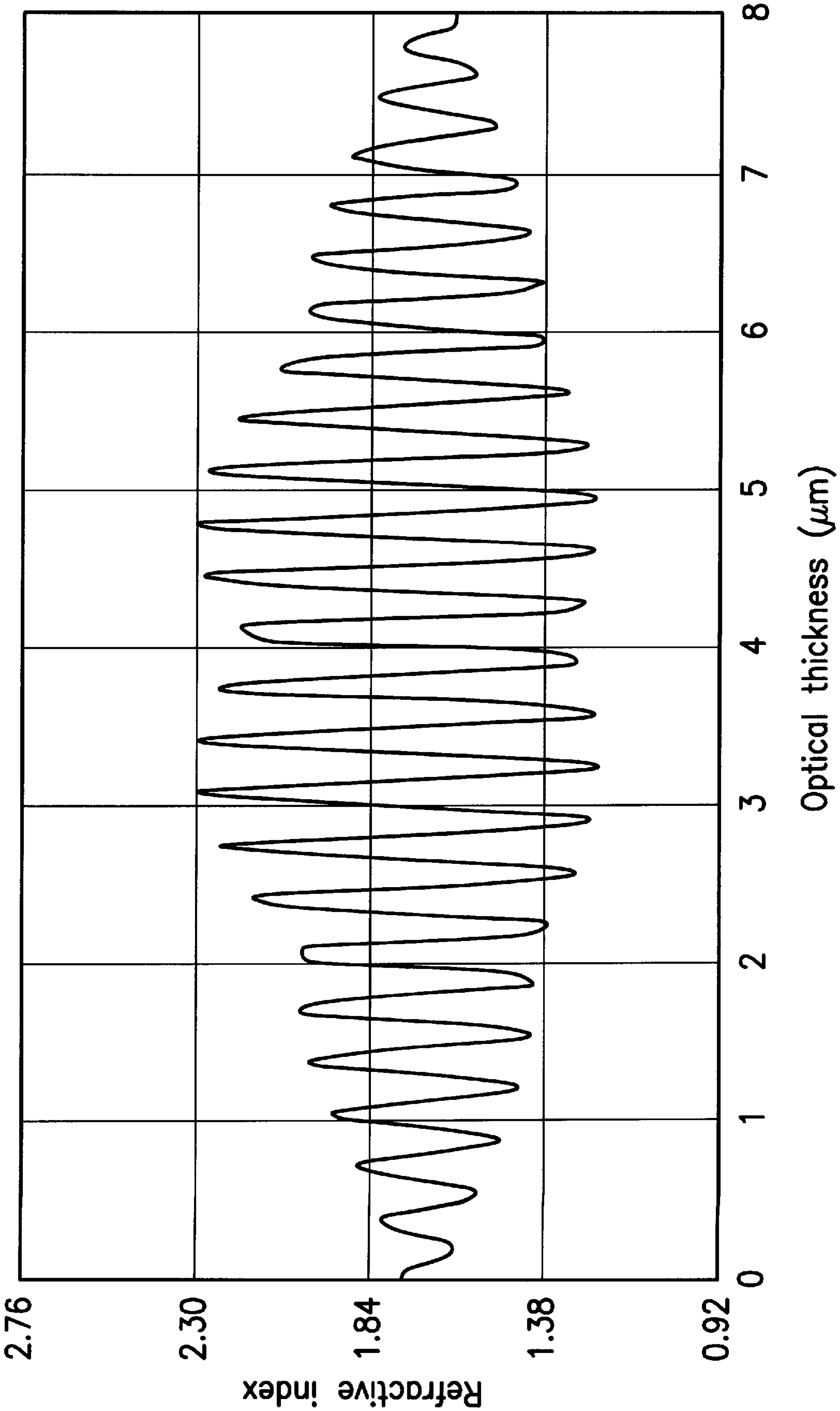
FIG. 10 is a diagram illustrating the relationship between the refractive index and the optical thickness for the functional coating of a red ribbon in reflection mode.
Figure 11:
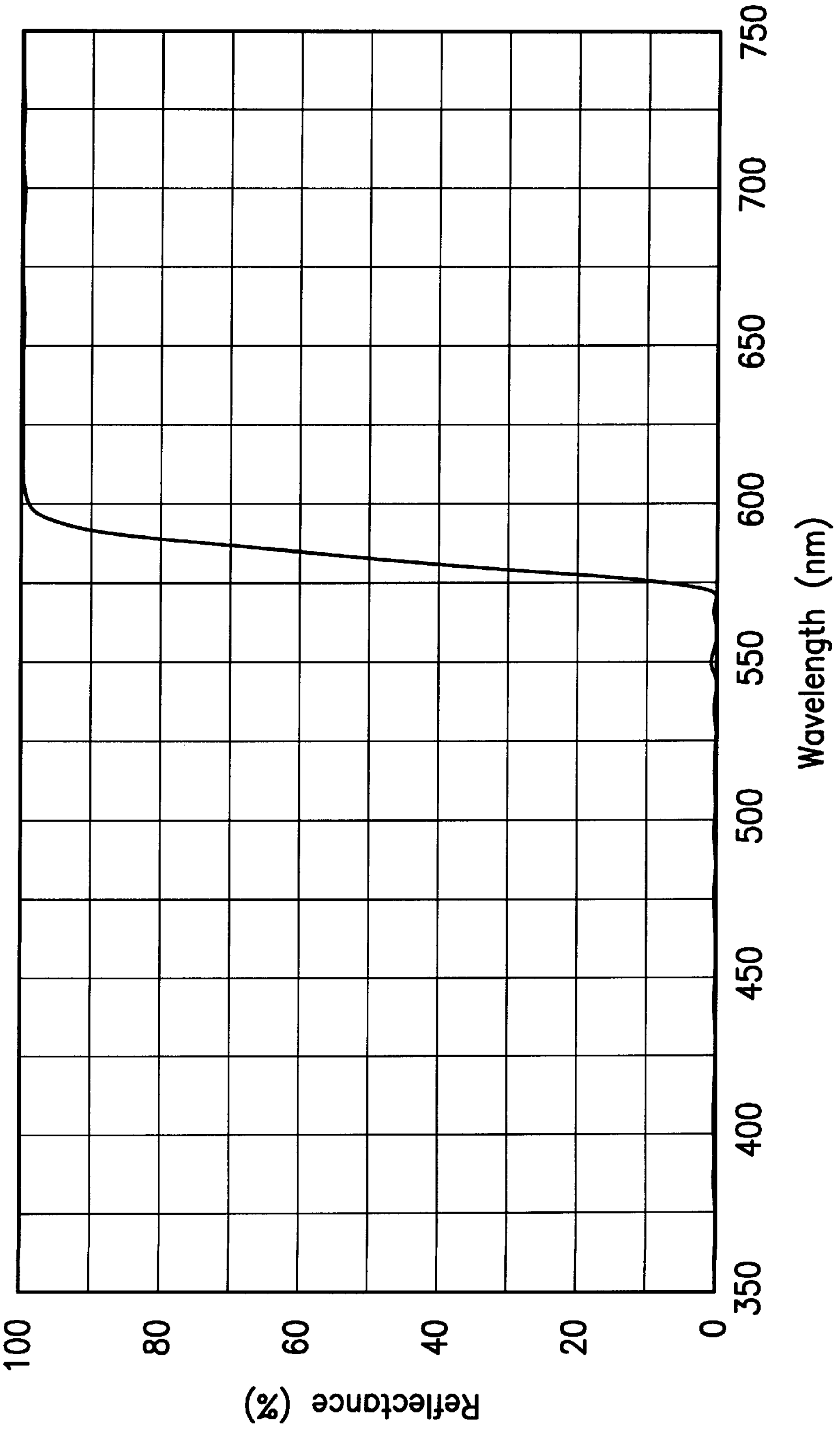
FIG. 11 is a diagram illustrating the reflectance spectrum at normal view for the functional coating of a red ribbon in reflection mode.

For example, the functional coating of a red ribbon in reflection mode can be realized by a layer of composite material whose reflective index varies in the growth direction of the layer, as shown in FIG. 10. The optical thickness is the integral of refractive index along the physical thickness. Such refractive index profile can be realized by co-deposition of $TiO_2$ and $CaF_2$, for instance. The reflectance spectrum at normal view is shown in FIG. 11.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A thermal transfer color-variable ribbon comprising:

a substrate;

a releasing agent, formed on the substrate, which has lower adhesion when heated;

a functional coating formed on the releasing agent, in which optical interference effect takes place while light enters into the functional coating;

an adhering layer formed on the functional coating, which can adhere the functional coating onto a receiving medium after the functional coating is released from the substrate by heating the releasing agent.

2. A thermal transfer color-variable ribbon as claimed in claim 1 wherein the substrate is glass.

3. A thermal transfer color-variable ribbon as claimed in claim 1 wherein the substrate is plastic.

4. A thermal transfer color-variable ribbon as claimed in claim 1 wherein the functional coating is formed by an odd number of layers of dielectrics.

5. A thermal transfer color-variable ribbon as claimed in claim 4 wherein the dielectrics are $SiO_2$ and $TiO_2$.

6. A thermal transfer color-variable ribbon as claimed in claim 4 wherein the dielectrics are $SiO_2$ and $ZrO_2$.

7. A thermal transfer color-variable ribbon as claimed in claim 1 wherein the functional coating is formed by an even number of layers of dielectrics and metal that are stacked alternately.

8. A thermal transfer color-variable ribbon as claimed in claim 7 wherein the dielectric is $SiO_2$ and the metals are Cr and Al.

9. A thermal transfer color-variable ribbon as claimed in claim 1 wherein a layer in the functional coating next to the releasing agent is a dielectric thin film.

* * * * *